(12) United States Patent
Morton et al.

(10) Patent No.: US 7,428,663 B2
(45) Date of Patent: Sep. 23, 2008

(54) ELECTRONIC DEVICE DIAGNOSTIC METHODS AND SYSTEMS

(75) Inventors: Robert Morton, Nepean (CA); Harold Levesque, Gatineau (CA)

(73) Assignee: Alcatel Lucent, Paris (FR)

( * ) Notice: Subject to any disclaimer, the term of this patent is extended or adjusted under 35 U.S.C. 154(b) by 577 days.

(21) Appl. No.: 10/857,826

(22) Filed: Jun. 1, 2004

(65) Prior Publication Data

US 2005/0278147 A1    Dec. 15, 2005

(51) Int. Cl.
*G06F 11/00* (2006.01)
(52) U.S. Cl. .............................. 714/36; 714/25; 702/183
(58) Field of Classification Search .................... 714/36
See application file for complete search history.

(56) References Cited

U.S. PATENT DOCUMENTS

| | | | |
|---|---|---|---|
| 5,463,766 A * | 10/1995 | Schieve et al. ................. 713/2 |
| 5,557,558 A * | 9/1996 | Daito ........................... 702/120 |
| 5,657,330 A | 8/1997 | Matsumoto et al. |
| 5,675,724 A | 10/1997 | Beal et al. |
| 5,748,877 A * | 5/1998 | Dollahite et al. ............... 714/36 |
| 5,987,625 A * | 11/1999 | Wolff ........................... 714/36 |
| 6,216,226 B1 * | 4/2001 | Agha et al. .................... 713/2 |
| 6,625,688 B1 | 9/2003 | Fruehling et al. |
| 6,826,713 B1 * | 11/2004 | Beesley et al. ................. 714/25 |
| 7,159,151 B2 * | 1/2007 | Morgan et al. ................. 714/43 |
| 2005/0033952 A1 * | 2/2005 | Britson ........................... 713/2 |

FOREIGN PATENT DOCUMENTS

WO    WO 00/68698 A    11/2000

\* cited by examiner

*Primary Examiner*—Christopher S McCarthy
(74) *Attorney, Agent, or Firm*—Kirk D. Houser; Arnold B. Silverman; Eckert Seamans Cherin & Mellott, LLC (57) ABSTRACT

Diagnostic methods and systems for electronic devices are disclosed. Separate dedicated diagnostic software code and operating code are respectively executed in a diagnostic mode and an operating mode of an electronic device. A determination may be made as to whether the electronic device is to be operated in the diagnostic mode or the operating mode when the electronic device is started, for example. A transition to the diagnostic mode from the operating mode may also be made in response to errors detected by online diagnostic tests performed in the operating mode. Results of diagnostic tests are preferably stored in a non-volatile memory for subsequent access, independent of the operating software code.

30 Claims, 7 Drawing Sheets

ELECTRONIC DEVICE DIAGNOSTIC METHODS AND SYSTEMS

FIELD OF THE INVENTION

This invention relates generally to electronic devices and, in particular, to performing diagnostic tests on electronic devices.

BACKGROUND

According to conventional diagnostic testing techniques for electronic devices, an electronic device is subjected to functional hardware testing during manufacturing and different field diagnostic testing after it has been deployed. Functional Test (FT) during manufacturing generally provides for assessment of basic hardware sanity of an electronic device as it comes off an assembly line. The diagnostic tests performed during FT are very detailed and low level in nature. Field diagnostic testing tends to be much less extensive than manufacturing diagnostic testing.

Manufacturing and field tests can be different for numerous reasons. For example, the tests may have been developed by different groups. Whereas manufacturing tests may be developed by production staff, field tests may be developed by research and development personnel, for instance. Field diagnostic tests are also normally run whenever an electronic device is powered up and therefore are preferably designed to run quickly. Test time does not tend to be as critical at the manufacturing stage, as manufacturing testing is performed before an electronic device is deployed and put into service. In addition, manufacturing diagnostic tests often require external equipment which might not be available when an electronic device is in service.

Whatever the reasons for the differences, the end result remains the same. Field diagnostic tests have different, in particular less extensive, coverage than manufacturing diagnostic tests. One effect of diagnostic test differences is that fault isolation and analysis while an electronic device is in the field or "in situ" may be rendered more difficult and lead to unnecessary returns of electronic devices to manufacturers for so-called root cause analysis or other types of fault and error analysis.

As those skilled in the art will appreciate, electronic device returns can be inconvenient for device owners, and analysis of returned electronic devices tends to be time consuming and costly for a manufacturer. For example, removing an electronic device from a field installation, such as pulling a circuit card from electronic equipment, changes the operating environment in which a failure or error occurred and may thus render the failure or error difficult or even impossible to reproduce. There is also a risk of Electro-Static Discharge (ESD) or other damage to the electronic device during handling and shipping of the electronic device to the manufacturer. However, as described above, current diagnostic techniques provide field diagnostic testing which is significantly less extensive than manufacturing diagnostic testing. Many hardware or other low-level failures or errors therefore cannot be detected in the field, which necessitates return of an electronic device to a manufacturer for testing and analysis.

SUMMARY OF THE INVENTION

Dedicated diagnostic software code, which is distinct from operating software code for an electronic device and is executed during a diagnostic mode of the electronic device, supports more extensive off-line field diagnostic testing for electronic devices without removing the electronic devices from their normal operating environment. Field diagnostic tests may have substantially the same coverage as and thus be correlated to manufacturing functional tests used for a particular electronic device.

Integration of manufacturing and field diagnostics test suites in accordance with an embodiment of the invention provides a shared approach to prototyping, debugging, and application diagnostics development.

According to one broad aspect, the invention provides a method of operating an electronic device on which both dedicated diagnostic software code and operating code are stored, including operations of determining whether the electronic device is to be operated in a diagnostic mode or an operating mode, executing the dedicated diagnostic software code on the electronic device where the electronic device is to be operated in a diagnostic mode, and executing the operating software code on the electronic device where the electronic device is to be operated in an operating mode.

The mode determination may be made, for example, based on a value in a storage location in a memory of the electronic device, the presence of a jumper on the electronic device, the position of a switch on an electronic device, or a user input.

In one embodiment, the mode determination is performed during a boot operation of the electronic device.

Multiple diagnostic modes may be provided, including one or more interactive or non-interactive modes. A field diagnostic mode and a manufacturing diagnostic mode having respective diagnostic test suites may also be provided, with the field diagnostic mode test suite including a subset of the manufacturing diagnostic mode test suite.

Results of diagnostic tests performed under control of the diagnostic software code are preferably stored in a memory of the electronic device, preferably a non-volatile memory. A state of the electronic device may also be stored in memory, before the command is performed, for example. The stored processor state may then be used in restoring a state of the electronic device where an error occurs while a command is being performed.

In one embodiment, the operating software code performs online diagnostic tests during the operating mode, and executes the dedicated diagnostic software code responsive to detection of an error by the online diagnostic tests.

Embodiments of the invention may be implemented in single processor or multi-processor electronic devices. In a multi-processor electronic device, either the operating software code or the diagnostic software code is executed in each processor. One of the processors may be designated a master processor, and possibly operated in a transparent mode to pass information between an interface and one or more slave processors. The transparent mode thereby effectively provides access to the slave processors through an interface to the master processor.

An electronic device is also provided in another aspect, and includes a memory and a processor. The memory stores dedicated diagnostic software code and operating software code and the processor is configured to execute either the dedicated diagnostic software code in a diagnostic mode of the electronic device or the operating software code in an operating mode of the electronic device.

The diagnostic software code may include multiple software code modules, including any of a single tasking command dispatcher kernel, a test application programming interface, a command software module, one or more test function software modules, one or more hardware interface modules, and one or more user interface modules.

A method of operating an electronic device is also provided, and includes loading dedicated diagnostic software code into a memory of the electronic device, performing functional tests on the electronic device by executing the dedicated diagnostic software code, loading operating software code into the memory of the electronic device, and after loading the operating software code, executing the dedicated diagnostic software code in a diagnostic mode of the electronic device. Loading of the operating software code may be dependent upon whether the electronic device passes the functional tests.

The dedicated diagnostic software code may be first loaded into a volatile memory device, and subsequently loaded into a non-volatile memory device, if the electronic device passes the functional tests, for example.

An electronic device according to another aspect of the invention includes an interface, a memory, and a processor. The processor is configured to load into the memory dedicated software code received through the interface, to perform a plurality of functional tests on the electronic device by executing the dedicated diagnostic software code, to load into the memory operating software code received through the interface, and, after loading the operating software, to execute the dedicated diagnostic software code in a diagnostic mode of the electronic device.

A further aspect of the invention provides a method of operating an electronic device on which both diagnostic software code and operating software code is stored, including operations of performing diagnostic tests on the electronic device by executing the diagnostic software code in a diagnostic mode of the electronic device, and providing access to results of the diagnostic tests. Access to the results of the diagnostic tests is independent of the operating software code, although the results of the diagnostic tests may also be made accessible to the operating software code.

There is also provided an electronic device comprising a memory storing both diagnostic software code and operating software code, and a processor. The processor is configured to execute the diagnostic software code in a diagnostic mode of the electronic device, the diagnostic software code performing diagnostic tests on the electronic device and providing access to results of the diagnostic tests. As above, access to the results of the diagnostic tests is provided independently of the operating software code.

A further method of operating an electronic device on which both dedicated diagnostic software code and operating code are stored is provided in another aspect of the invention. The operating software code is executed on the electronic device in an operating mode of the electronic device, and includes software code for performing online diagnostic tests during the operating mode. In response to detection of an error by the online diagnostic tests, the operating software code invokes the dedicated diagnostic software code to thereby pass control to the diagnostic software code. The diagnostic software code then performs offline diagnostic tests on the electronic device in a diagnostic mode.

In a related aspect, an electronic device is provided and includes a memory storing both dedicated diagnostic software code and operating code, and a processor configured to execute the operating software code in an operating mode of the electronic device, the operating software code comprising software code for performing online diagnostic tests during the operating mode, and to invoke the diagnostic software code from the operating software code in response to detection of an error by the online diagnostic tests to thereby pass control to the diagnostic software code, the diagnostic software code performing offline diagnostic tests on the electronic device in a diagnostic mode of the electronic device.

Other aspects and features of embodiments of the present invention will become apparent to those ordinarily skilled in the art upon review of the following description of specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

An offline diagnostic runtime environment (ODRE) according to an embodiment of the invention is designed to enable low-level diagnostic tests to be performed on a target electronic device while it is not in service. However, a device under test may remain in the system while tests are conducted. Together with a complete suite of hardware diagnostics, the ODRE may also cover embedded diagnostic requirements for functional testing during manufacturing of an electronic device. Thus, an ODRE in accordance with embodiments of the invention may provide both a manufacturing platform for prototyping and debugging electronic devices for use during manufacturing or when failed or defective electronic devices are returned to a manufacturer and a field platform for use independently in the field for troubleshooting faulty electronic devices. Field diagnostics may be particularly useful, for example, for failure or error analysis of electronic devices which may be replaced in the field, also commonly referred to as field replaceable units or FRUs.

As described in further detail below, the ODRE preferably provides the ability to perform an exhaustive set of diagnostics, at electronic device power-up for instance, to test electronic device prototypes or new electronic devices destined for field deployment, and to assist in the debugging of problematic electronic devices in a manufacturing or repair facility or in the field. In one embodiment, at least field diagnostic test results are stored, as a failure log for instance, in a memory of an electronic device to facilitate the identification of failures both in the field and at a later time in the manufacturing/repair facility.

Figure 1:
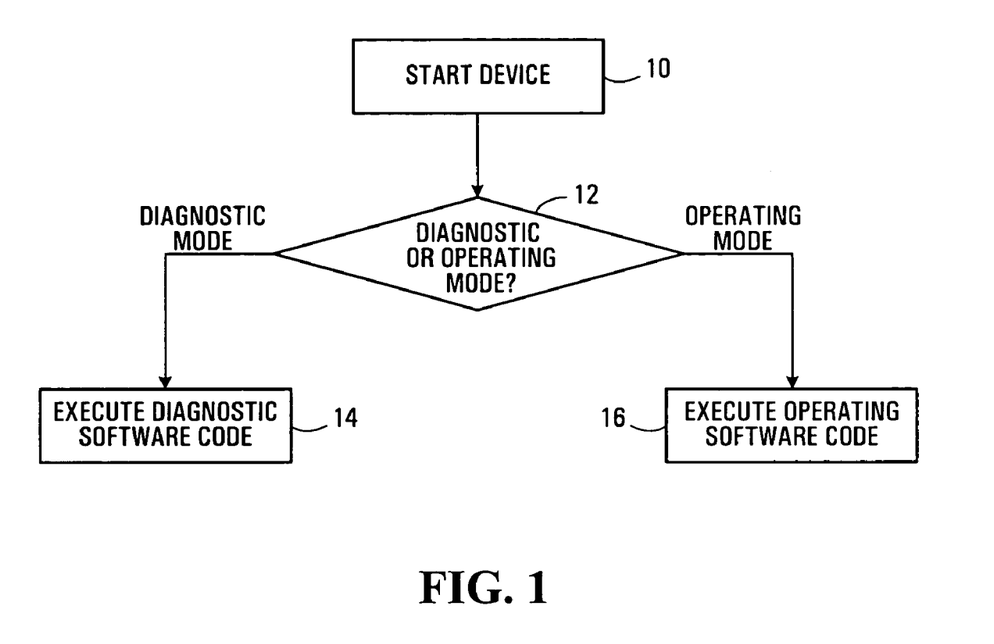
FIG. 1 is a flow diagram of a method according to an embodiment of the invention.

FIG. 1 is a flow diagram of a method according to an embodiment of the invention. It should be appreciated that the method shown in FIG. 1, as well as the content of the other drawings, is intended solely for illustrative purposes and relates to embodiments of the invention. Other embodiments of the invention may include further, fewer, or different method steps or components arranged or connected differently than explicitly shown in the drawings.

In the embodiment of the invention shown in FIG. 1, field diagnostic tests may be performed when an electronic device is started at 10, after a reset of the electronic device, for example. A determination is made at 12 as to whether the electronic device is to be operated in a diagnostic mode or an operating mode. The method reverts to either 14 or 16 depending upon the determination at 12.

Diagnostic software code is preferably adapted to start up with relatively few electronic device resources to allow for low-level debugging of failed electronic devices. For embodiments in which field diagnostics are performed at startup, as shown in FIG. 1, the determination at 12 is preferably made during an initial stage of a boot operation. Whereas normal operation of an electronic device may require the initialization of many device components, the diagnostic software code might be executable with fewer components.

For example, field diagnostics may be configured to test a particular component or function of an electronic device which is required for proper operation of a software application on the electronic device. The particular component or function itself, although tested by the diagnostic software code, is not required for execution of diagnostic software code. In this case, if the component or function does not initialize properly during startup, the software application will not operate properly. Where the software application supports substantially all functions of the electronic device, as in a circuit card for instance, this situation may result in an inoperative or "dead" electronic device which cannot be started. However, since the failed component or function is not required for field diagnostics, performing the determination at 12 before the component or function is initialized and reverting to 14 when the electronic device is to be started in diagnostic mode allows the failed component or function to be detected, even if the electronic device would be rendered inoperative in a normal startup or boot sequence.

Therefore, the determination at 12 is preferably made as soon as the diagnostic software code can possibly be executed. As those skilled in the art will appreciate, this startup sequence may be implemented within boot software code which is executed when an electronic device is started. Any further startup operations associated with normal operating software or functions, initialization of additional components or functions for example, may subsequently be performed at 16.

The determination at 12 may be made, for example, on the basis of a flag indicating whether the electronic device is to be operated in the diagnostic mode or the operating mode. In one embodiment, a storage location in a memory stores a flag indicating whether the electronic device is to be operated in the diagnostic mode or the operating mode. According to another embodiment, a flag is stored in a register of a processor. In a still further embodiment, a boot loader which is executed during a boot operation accesses a flag stored in memory to determine whether an electronic device is to be operated in a diagnostic mode or an operating mode. The boot loader then sets a value in a processor register accordingly. The value in the processor register may also indicate in which one of multiple diagnostic modes, described in further detail below, the electronic device is to be operated.

A mode flag or similar indicator may be set via a user interface to an electronic device, for example. In the above example of a circuit card as the electronic device, this function may be provided through a command line interface.

The diagnostic software code executed at 14 when the electronic device is to be operated in a diagnostic mode is preferably dedicated software code that primarily supports functions relating to diagnostic testing of the electronic device. These functions may include performing diagnostic tests, storing and/or reporting results of the tests, generating error or failure messages, or performing recovery or other possible error or failure processing operations, for example. Therefore, references herein to dedicated diagnostic software code should be interpreted accordingly. Although diagnostic software code functions relate to diagnostic tests and results, to minimize startup operations as described above for instance, it should be appreciated that diagnostic software code functions are not necessarily restricted only to performing the diagnostic tests.

In contrast, operating software code may support any normal operating functions of an electronic device. Operating software code may include, for example, any of operating system software, software applications, software modules, and software utilities. Where the electronic device is a circuit card or some other type of application-specific device, the operating software code may be a single software application. In other electronic devices, operating system software provides a platform in conjunction with which any of multiple software applications may be executed. The architecture and functions supported by operating software code will be dependent upon the type of electronic device and its intended operation. The present invention is in no way limited to any particular implementation of operating software code.

According to an embodiment of the invention, diagnostic software code and operating software code are separately and exclusively executable at 14 and 16. Diagnostic software code and operating software code therefore need not be compatible or implemented using the same programming language. However, some level of interaction between diagnostic software code and operating software code or sharing of some software modules between diagnostic software code and operating software code may provide code space savings, which is important on electronic devices having limited memory or processing resources as described in further detail below.

In diagnostic mode, only those functions supported by the diagnostic software code are preferably available. Similarly, in operating mode, functions supported by the operating software code are available and functions supported only by the diagnostic software code are preferably not available. Common functionality supported by both the diagnostic software code and the operating software code or shared software modules may be available in both modes.

However, the diagnostic mode and the diagnostic software code are preferably independent of the operating mode and the operating software code. In particular, the diagnostic software code preferably does not rely on proper functioning of the operating software code, unlike in conventional diagnostic techniques. This separation of diagnostics and normal operations may also enable execution of the diagnostic software code even when components or functions required for proper execution of the operating software code have failed.

A further advantage of providing separately executable dedicated diagnostic software code and operating software code on an electronic device relates to the extent and types of testing that may be performed. Field diagnostic testing in accordance with conventional techniques must be performed without affecting the operation of electronic device components and memory contents, for example, so as to ensure that operating software code remains operational. Conventional power-up field diagnostics are run in a normal operating mode of the electronic device and are therefore intended to be performed without causing electronic device errors or failures. A separate independent diagnostic mode and software code in accordance with embodiments of the invention allow extensive field diagnostics, including tests which are "destructive" from an operating standpoint, to be performed. An electronic device reset upon completion of diagnostics may then appropriately initialize any components affected by destructive diagnostic testing, to thereby enable operating software code to be subsequently executed.

Although preferably separately executable, the diagnostic software code and the operating software code may be stored in a common memory of the electronic device. For example, many electronic devices include a non-volatile application memory which stores software code to be executed by a processor. Software code is typically loaded from the non-volatile memory into a RAM or other volatile memory for execution. In this type of device, both the diagnostic software code and the operating software code, a software application in this example, are stored in the application memory, and either the diagnostic software code or the operating software code is loaded into the RAM for execution.

In accordance with another embodiment of the invention, results of diagnostic tests performed under control of the diagnostic software code are stored in a memory of the electronic device. Stored result records may include, for example, an identification of a particular diagnostic test, a test error code which identifies a type of failure or error detected by the test, an electronic device life count or other indicator of the time at which the test was performed and the results were collected, and a checksum or other data integrity checking information. In other embodiments, further or fewer test results fields or information may be stored.

Test results may be stored in a shared memory along with other information or in a separate memory device. In one embodiment, a single Flash memory device is used to store the mode flag described above and results of diagnostic tests. A test result log, which may include information associated with all tests or a failure log including information for only those tests which were not successful or identified errors or failures, is preferably stored in a non-volatile memory device. Storage of test results in a non-volatile memory device facilitates the identification of failures both in the field and, at some later time, at a repair facility. A local test result log stored in a memory of an electronic device under test may also be accessible to the operating software code, to thereby provide access to test results during subsequent normal electronic device operation.

Figure 2:
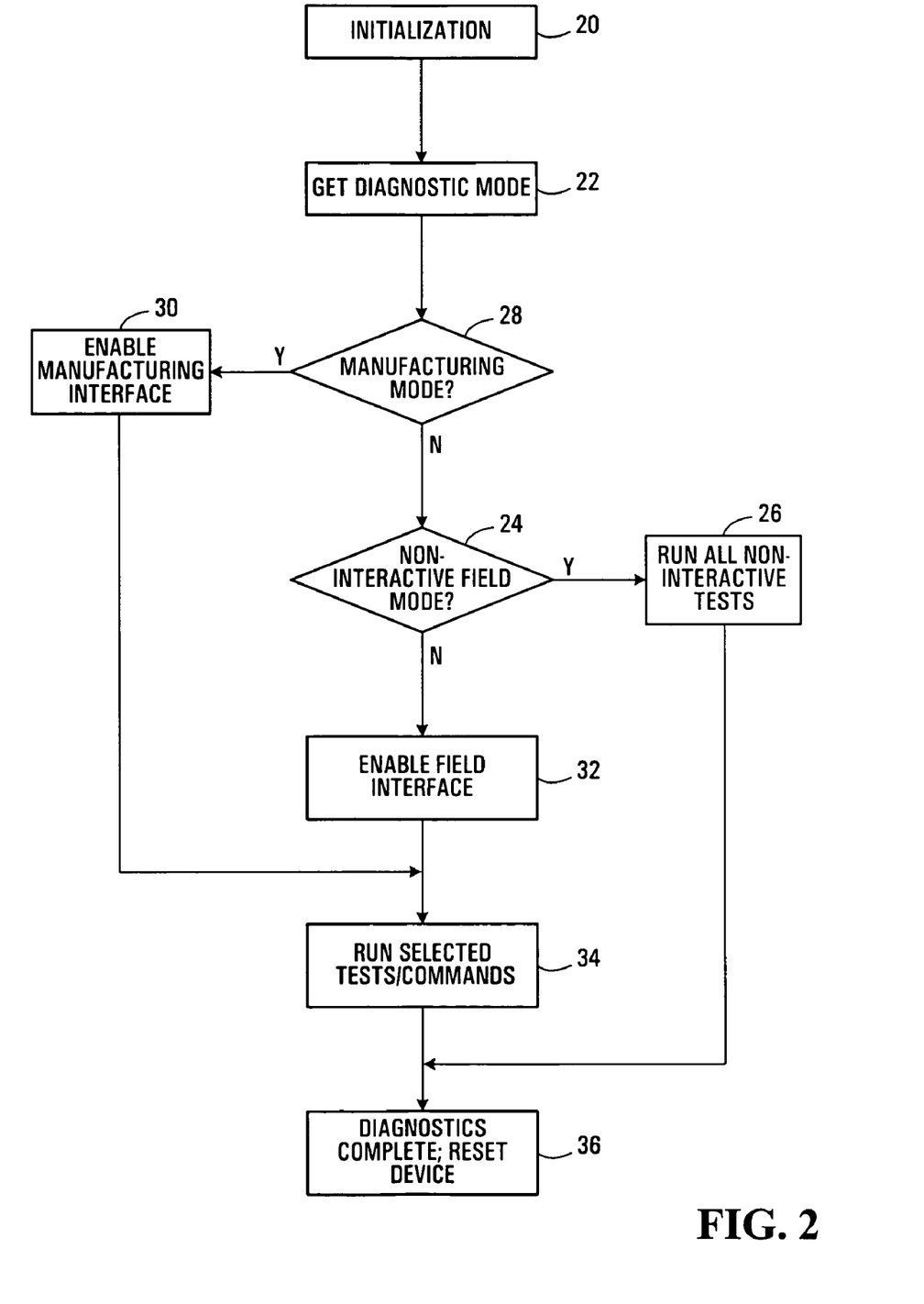
FIG. 2 is a flow diagram of a method according to another embodiment of the invention.

FIG. 2 is a flow diagram of a method according to another embodiment of the invention. As in FIG. 1, a startup or boot time diagnostic mode is presented for illustrative purposes in FIG. 2. FIG. 2 also illustrates multiple diagnostic modes.

The initialization operations performed at 20 may include initializing sufficient electronic device registers, components and functions for execution of diagnostic software code, as described above. At 22, one of a plurality of diagnostic modes is determined, by reading a flag or value in a data store or processor register or detecting the presence of a jumper, the position of a switch, or a user input, for instance. In one embodiment, a mode flag is set by maintenance or repair personnel when diagnostic tests are to be performed on an electronic device, and the electronic device is then reset. A boot loader or other boot software code accesses the mode flag in a memory to determine whether the electronic device is to be started in a diagnostic mode or operating mode and sets a value in a processor register accordingly. The value specifies a selected diagnostic mode, and the diagnostic software code includes instructions for checking the processor register. In other embodiments, a single flag or indicator may be used to select or set a diagnostic mode, and the method may proceed substantially directly from 20 to 24 without an additional intervening mode setting operation.

Determinations of the selected diagnostic mode are made at 24 and 28. Separate determinations are shown at 24 and 28 to explicitly illustrate similarities and differences between diagnostic modes. However, it should be appreciated that in other embodiments, a single determining operation may be implemented. In another embodiment, for example, a one-to-many branch operation based on the mode flag value is implemented, illustratively as a C switch statement.

Where a non-interactive field mode has been set, as determined at 24, diagnostic tests which do not require any interaction with a user are performed at 26. Non-interactive field mode provides for unattended diagnostics, which may be preferred when maintenance or repair personnel are at a remote site or diagnostics are to be run on multiple electronic devices.

A manufacturing diagnostic mode is also provided. At 30, a user interface is displayed at a test or control terminal at a manufacturing or repair facility, for example, when the manufacturing diagnostic mode has been set and is detected at 28. Through the user interface, specific tests or groups of tests and/or commands may be selected or otherwise entered, at a command line for instance, and are performed at 34. Diagnostic tests performed during manufacturing mode may involve external testing equipment which is not typically available at a field installation. Therefore, manufacturing mode may be applicable to electronic devices before deployment, as they leave an assembly line for instance, or after electronic devices have been returned to a manufacturer or vendor for fault analysis. Although it is expected that an interactive diagnostic mode would generally be preferred during pre-deployment or repair diagnostics, a non-interactive manufacturing mode may also be provided in other embodiments of the invention.

In the example method of FIG. 2, three diagnostic modes are provided, including the non-interactive field mode and the manufacturing mode described above, as well as an interactive field mode. Negative determinations at 24 and 28 indicate that the interactive field mode has been set. A field user interface is displayed at 32, through which particular tests and commands may be selected. The manufacturing and field user interfaces may be substantially similar, with possibly different available tests and commands. For example, tests and commands involving external test equipment might not be available for selection in the field user interface.

Although the interactive field mode is a field diagnostic mode, it should be appreciated that the field user interface is not necessarily displayed at a terminal or system which is physically co-located with an electronic device under test. In embodiments which support control of diagnostics from a remote site, the field user interface may be displayed at a terminal at the remote site.

At 36, the electronic device under test is reset after diagnostics are complete. For flag-based mode selection, mode flags are preferably cleared or set to indicate operating mode, so that the electronic device resumes normal operations on the next boot operation. Alternatively, electronic device reset may be responsive to the entry or selection of a reset command or function by a user or completion of diagnostic tests without errors or failures.

From the above description of FIG. 2, it will be apparent that the field and manufacturing diagnostic modes have respective associated diagnostic test suites. In a preferred embodiment, the field diagnostic mode test suite includes a subset of the manufacturing diagnostic mode test suite. For example, the manufacturing diagnostic mode test suite may include both internal diagnostic tests associated with internal components of the electronic device and external diagnostic tests associated with external testing equipment, and the field diagnostic mode test suite may include the internal diagnostic tests. Similarly, a non-interactive mode test suite may be a subset of the complete field diagnostic mode test suite, including field diagnostic mode tests which can be run without any user inputs or interaction.

Variations of the method of FIG. 2 will be apparent to those skilled in the art. For example, the field interactive mode is effectively a default mode in FIG. 2 where neither the non-interactive field mode nor the manufacturing mode has been set. In another embodiment, error or failure processing is performed where none of the available modes has been set. In this case, a third determination step for field interactive mode may be provided in FIG. 2, or another branch path may be provided in a one-to-many branch implementation, with error processing to display an error message for instance, responsive to a negative determination at all mode determining steps.

Other error processing functions are also contemplated if a valid mode is not determined. For example, if a startup mode value passed from a processor register or other means is missing or invalid, the diagnostic software code may attempt to auto-detect an interface on an electronic device under test, or more strictly whether another device or system is currently connected to the interface. In one embodiment, this is accomplished by sending predetermined characters or other data patterns to an interface and then waiting for a response. An external device, illustratively a test executive running on an external computer system, recognizes the characters and returns a response to the device under test. The response preferably includes an identifier which allows the diagnostic software code to start in an appropriate mode. When no response is received, the diagnostic software code may then start in a predefined default mode. The default mode is one of the existing valid modes, specified at compile time for instance.

The diagnostic software code is preferably a single-threaded, run-to-completion task, based on a command dispatcher model. To prevent faulty hardware from crashing the diagnostic software, a state of the electronic device, or at least the state of a processor of the electronic device, is saved before each call to a command or function. Should a recoverable processor exception or other error occur during command execution, access to an invalid memory location for instance, the cause of the exception can be identified and the preceding electronic device or processor state can be recovered. A method in accordance with a further embodiment of the invention which supports this type of state recovery is illustrated in the flow diagram of FIG. 3.

Figure 3:
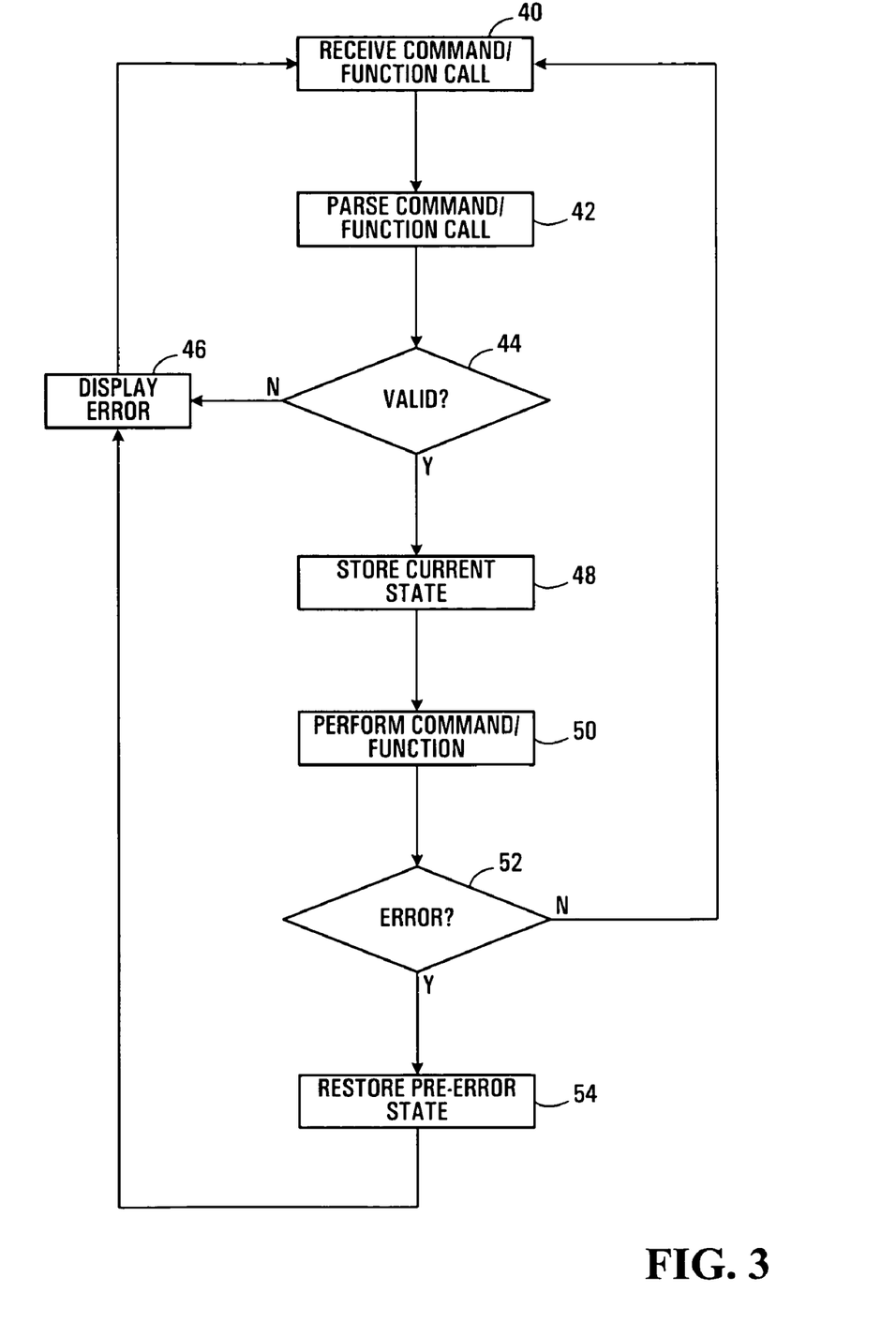
FIG. 3 is a flow diagram of a method in accordance with a further embodiment of the invention.

The method begins at 40, when a command or function call is received. Those skilled in the art will appreciate that commands or function calls may be received at 40 from diagnostic software code itself, from a user interface provided by the diagnostic software code, or through messages sent by another electronic device. The method of FIG. 3 is in no way limited to any particular source of a command or function call.

The received command or function call is parsed or otherwise processed at 42 into a format which is recognizable by diagnostic software code segments or electronic device components responsible for performing the actual command or function. In the method of FIG. 3, the validity of a command or function is checked at 44. Command or function validity may be determined, for example, based on predefined syntax, data integrity check information in the command, or a set of defined or available commands or functions. An invalid command or function causes an error to be displayed at 46. Further error processing may also be performed.

If the command is valid, as determined at 44, then a current state of the electronic device or its processor is stored in a memory at 48. Saving the processor state at 48 may involve saving the contents of a specific set of processor registers in memory (usually RAM), such that is possible to recover their contents from the memory should a code execution error create an abnormal or exceptional situation where software code can no longer run safely. Restoring the processor state brings it back to the exact same instruction that was being executed when the processor state was saved, but preferably with some way of indicating that it has just returned from an abnormal situation so that it can proceed on a different path, for instance.

As one goal of storing the state at 48 is to provide for recovery after an exception and possibly other errors or failures, storage of the state in a non-volatile memory device may be preferred. The processor state may instead be stored in volatile memory, like most other data created by software. Should an error corrupt a volatile memory area where the processor state is stored, it would likely also corrupt the software code itself or other data needed to run the software code, such that recovery from the error would not be possible. Thus, storage of the processor state in a non-volatile memory might not provide a substantial advantage during the execution of the software but could be used at a later time for root-cause analysis of a critical failure. A state information store, like other data stores described herein, may be provided in a dedicated memory device or as one of multiple data stores within a shared memory device.

At 50, the command is dispatched to a component or code segment and performed. The particular element which performs a command or function may be dependent upon both hardware and software architectures of the electronic device.

In the event that an error is detected at 52 while the command or function is being performed, the stored state information is used at 54 to recover the pre-error electronic device or processor state, and an error message is displayed at 46. As will be apparent from the foregoing, a command or function may be associated with diagnostic tests which may detect errors or failures. However, it should be appreciated that in the context of FIG. 3, an error at 52 is an error in the execution of diagnostic software code, as opposed to an error which is detected using the diagnostic software code. Although these types of error may be somewhat related, in that a hardware component failure detected during a diagnostic mode may also cause execution errors, embodiments of the invention are directed primarily to detection and possibly logging of diagnostic errors or failures, not necessarily execution errors. In some embodiments, however, execution errors are also logged, as such errors may indicate that a specific device can no longer be accessed or that a test may have impacted the integrity of the diagnostic software code.

After an error recovery or completion of a command or function with no error, the method returns to 40 to receive another command or function call. Thus, diagnostic software code may support multiple commands or function calls, and a state of the electronic device or processor is preferably stored before each command or function is performed, substantially as described above.

Figure 4:
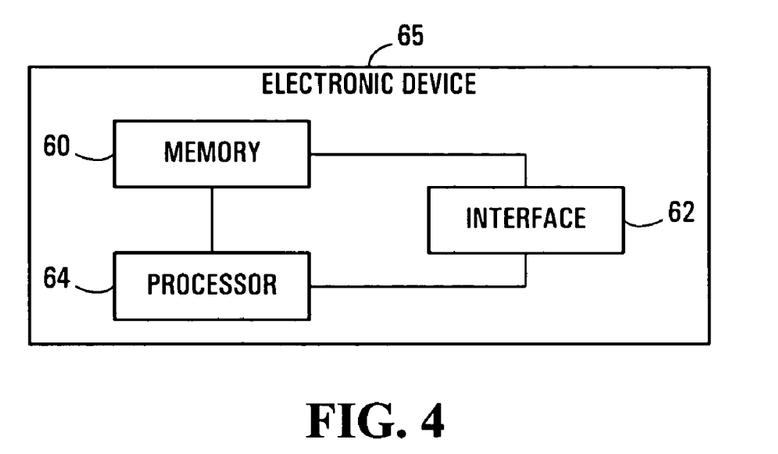
FIG. 4 is a block diagram of an electronic device in which embodiments of the invention may be implemented.

The foregoing description relates primarily to methods according to embodiments of the invention. FIG. 4 is a block diagram of an electronic device in which embodiments of the invention may be implemented. The example electronic device 65 in FIG. 4 includes an interconnected memory 60, interface 62, and processor 64.

The memory 60 preferably includes a solid state memory device, and may include multiple memory devices and multiple different types of memory device, as described in further detail below with reference to FIG. 5. At least dedicated diagnostic software code and operating software code are stored in the memory 60, in respective memory areas or memory devices of the memory 60 for instance.

The processor 64 is a microprocessor or other type of processing device for executing software code. In accordance with an embodiment of the invention, the processor 64 executes either the diagnostic software code or the operating software code in a diagnostic mode and an operating mode, respectively, of the electronic device 65. The processor 65 may also execute other software code in other embodiments.

In operation, the processor 64 determines whether the electronic device 65 is to be operated in a diagnostic mode or an operating mode and executes either the diagnostic software code or the operating software code stored in the memory 60. Features and functions of the diagnostic software code and the operating software code have been described in detail above.

Figure 5:
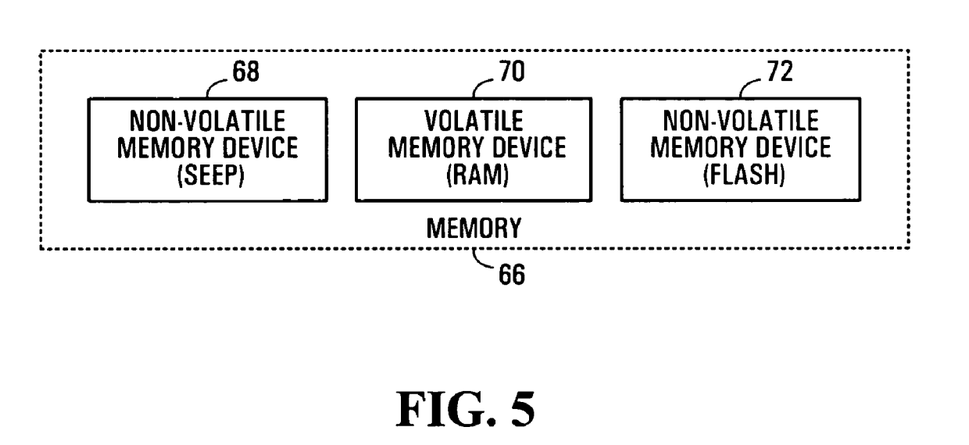
FIG. 5 is a block diagram of an example memory including multiple memory devices.

FIG. 5 is a block diagram of an example memory including multiple memory devices. The memory 66 includes non-volatile memory devices 68 and 72 and a volatile memory device 70. The non-volatile memory device 68 is illustratively a Serial Electrically Erasable Programmable ROM (SEEP) device, the volatile memory device 70 is illustratively a RAM, and the non-volatile memory device 72 is illustratively a Flash memory device.

In one embodiment, the SEEP device 68 is a relatively small Flash memory device which is used to store flags, including the mode flag described above. The processor 64 may then determine whether to execute the dedicated diagnostic software code or the operating software code by accessing the flag in the SEEP device 68.

According to another embodiment, results of diagnostic tests conducted during a diagnostic mode are also stored in the SEEP device 68. In this case, predetermined respective portions of the SEEP device 68 may be dedicated to the tests results and to the mode flag and possibly other flags or data. According to one embodiment, the SEEP device is a 1024-word memory device, in which the first 64 words are reserved for the mode flag and other boot parameters, and the other 960 words are reserved for diagnostic data including test results. Processor or device state information is similarly stored in the SEEP device 68 in another embodiment of the invention, to allow subsequent root cause or other failure analysis based on processor states. Alternatively, one or more separate memory devices may be provided for storing the diagnostic test results and state information.

In many electronic devices, software code is loaded into a volatile memory for execution by a processor. In FIG. 5, where the Flash device 72 is an application memory bank in which the diagnostic software code and the operating software code are stored, software code may be loaded from the Flash device 72 into the RAM 70 for execution by the processor 64. This loading function may be performed, for example, by a boot loader during a boot operation. The RAM 70 may also be used to store other data, including data generated by the diagnostic software code or the operating software code, for instance. According to one embodiment of the invention, processor state is stored in the RAM 70 for error recovery.

Other functions, numbers, and types of memory device than the example arrangement shown in FIG. 5 will be apparent to those skilled in the art. For example, at least a reset code portion of boot software code is typically stored in a dedicated memory device which is separate from application memory. Some types of electronic device, circuit cards for instance, incorporate dual Flash banks for storing images of software application code. Dual flash banks are often used for redundancy and upgrades. One bank is active, i.e., currently in use, while the other one is inactive. When an upgrade is performed, new software is copied to the inactive flash bank, the flash bank activity status is swapped, and the device is rebooted using the newly upgraded flash bank. The previously active flash bank, which includes older software, is then overwritten with the new software firmware to thereby provide redundancy in case one of the flash banks gets corrupted.

Different degrees of memory device sharing are also contemplated, from per-data store dedicated memory devices to single shared memory devices in which all data stores are implemented as memory areas within a single memory device. Many electronic devices implement some combination of shared and dedicated memory devices.

Although shown as a single component in FIG. 4, the interface 62 may include one or more interface devices. A single interface device may also provide an interface to more than one user or external device. A serial port, for example, may be used to exchange data with any device enabled for sending and/or receiving data through a serial connection. Through the interface 62, a user may control diagnostic testing of the electronic device 65 in the manufacturing or interactive field diagnostic mode described above or provide access to data such as diagnostic test results stored in the memory 60.

Figure 6:
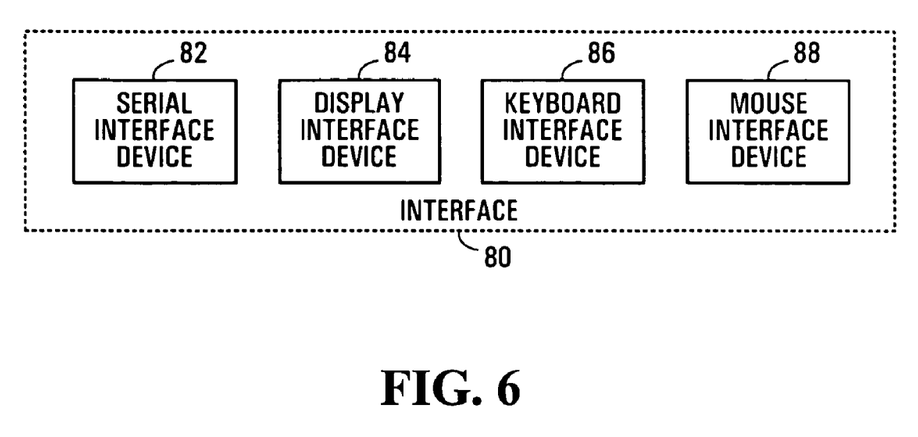
FIG. 6 is a block diagram of an example interface including multiple interface devices.

FIG. 6 is a block diagram of an example interface including multiple interface devices. The interface 80 in FIG. 6 includes a serial interface device 82, a display interface device 84, a keyboard interface device 86, and a mouse interface device 88, examples of which will be apparent to those skilled in the art. The particular interfaces shown in FIG. 6 are intended for illustrative purposes. An electronic device may include further, fewer, or different interfaces than those shown in FIG. 6, depending on the type of an electronic device and the components it incorporates. A circuit card, for instance, might include only a serial interface device 82 such as a serial port for communicating with an external control terminal or computer system. An electronic device having a display may also include the display interface device 84.

The serial interface device 82 is one illustrative example of a type of interface through which information may be exchanged with other electronic devices or systems. Other possible interfaces include those associated with various types of communication channel and/or protocol, such as an Ethernet link, a Universal Serial Bus (USB) link or virtually any other type of standard or proprietary interface. An interface could also be implemented as a dedicated port or data packets (e.g. TCP/IP, ATM cells) transmitted over a communication channel to another electronic device.

In an interactive diagnostic mode, information is transferred through the interface 62, or an interface device 82, 84, 86, 88 in the interface 80. Information may also be transferred through more than one interface device during an interactive diagnostic mode. For example, a user interface may be displayed to a user through the display interface device 84, and user inputs for command or function entry or selection may be received through the keyboard interface device or the mouse interface device 86, 88.

According to another embodiment, information is exchanged between an electronic device interface 62 and an external computer system or terminal which provides interfaces to input and output devices through a single interface device. In the above example of a circuit card having a serial port, information may be transferred to a control terminal through the serial port and a serial connection and displayed to a user at the control terminal. User inputs received through a keyboard, mouse, or other input device at the control terminal are then transferred to the electronic device through the serial connection and port. For this type of interactive operation in conjunction with an external device or system, user inputs may be received through the serial interface device 82 or another interface which provides for data exchange with external devices or systems.

Therefore, it will be apparent user interfaces may be provided locally, using electronic device components, or remotely, using components implemented at a remote system or device.

Another function of the interface 62, or possibly one or more interface devices in an electronic device having multiple interfaces, is to provide access to stored diagnostic tests results. According to one embodiment, the interface 62 provides direct access to a test results data store in the memory 60. Direct memory access effectively bypasses the processor 64 for memory access operations and thus provides for access to test results even when an electronic device cannot be properly started or when a main source of power cannot be applied to the electronic device. For example, in one embodiment, power is locally applied to a memory device in the memory 60, and information stored in the memory device is then retrieved using a dedicated port. This may be achieved without having to start or even apply a main power source to the electronic device. Diagnostics logs may therefore remain available, for example, after an electronic device has failed or has been removed from a normal operating environment for some other reason and returned to a manufacturer or vendor for analysis. Those skilled in the art will be familiar with many suitable direct memory access protocols and mechanisms through which access to diagnostic test results in this manner may be provided.

The interface 62 in the electronic device 65 may also enable transmission of diagnostic test results to an external device or system. Although storage of test results at the electronic device may be preferred to provide for later analysis, test results may also or instead be transmitted through the interface 62 as they are collected or upon completion of diagnostic testing, for example, to one or more remote sites for analysis.

Figure 7:
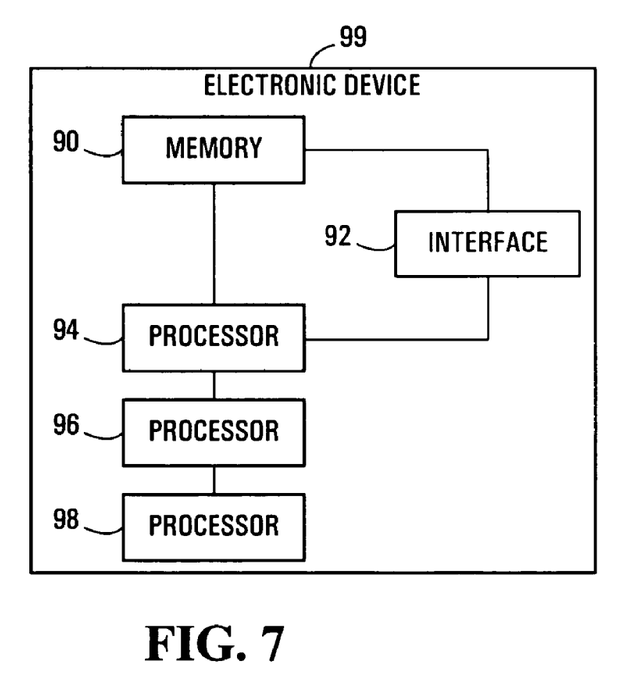
FIG. 7 is an example of a multi-processor electronic device in which embodiments of the invention may be implemented.

Embodiments of the invention may also be implemented in electronic devices which include more than one processor. FIG. 7 is an example of a multi-processor electronic device. The electronic device 99 includes a memory 90, and interface 92, and processors 94, 96, 98, which may be substantially similar to the memory, interface, and processor components described above with reference to FIGS. 4-6.

In the case of a multi-processor electronic device, each processor 94, 96, 98 runs its own instance of diagnostic software code when the electronic device is operated in a diagnostic mode. In an operating mode, each processor 94, 96, 98 may similarly execute operating software code. Operating software code for the multi-processor electronic device 99 may include common software code executed by all of the processors 94, 96, 98, respective software code, illustratively different software applications, executed by the processors 94, 96, 98, or some combination thereof.

One of the processors, the processor 94 in the electronic device 99, may be designated as a master processor. The master processor 94 preferably determines whether the electronic device 99 is to be operated in the diagnostic mode or the operating mode, and the slave processor 96, 98 are configured to execute the diagnostic software code under the control of the master processor 94. Master/slave processor operation in the operating mode may be substantially similar, with the master processor 94 controlling the operation or certain aspects of the operation of the slave processors 96, 98. However, a master/slave designation for the purposes of the diagnostic mode need not be maintained for the operating mode. A different one of the processors 94, 96, 98 may be a master processor in the operating mode, or the processors 94, 96, 98 may operate as peers in the operating mode, for instance.

As shown, the interface 92 is connected to the master processor 94. In one embodiment, all information transfer through the interface 92 is handled by the master processor 94, and inter-processor messaging is used to provide a common protocol for transfer of information between the master processor 94 and the slave processors 96, 98. A timeout value may also be provided to enable a processor, illustratively the master processor 94, to determine when another processor may not be responding.

One possible implementation of a master/slave communication path is a virtual Universal Asynchronous Receiver/Transmitter (UART) channel through shared media. The implementation of this virtual channel is hardware dependent. For example, buffer descriptors can be located in a memory area or device in the memory 90 which is shared between the processors 94, 96, 98 to manage input and output buffers and provide standard i/o support operation of the slave processors 96, 98 in the diagnostic mode.

Inter-processor communications may also be accomplished over other types of media than shared memory. Where each processor has an associated communication port or interface, communications may be established through a connection between the ports or interfaces. The present invention is in no way limited to any particular type of inter-processor medium, communication link, or protocol.

In another embodiment, the diagnostic software code may be executed on the master processor 94 in a transparent interactive mode, in which command or function entries, for example, received via the interface 92 are transmitted to the slave processors 96, 98. Messages from the slave processors 96, 98 are similarly relayed back to a user interface through the interface 92. This feature gives a user the ability to control any slave processor 96, 98 as if directly connected to an interface to that processor. A shared memory or other medium between the processors 94, 96, 98 as described above may facilitate the transparent master processor mode.

The master processor 94 may be placed in transparent mode through a command received through any of the interfaces described above, for example. According to one embodiment, the transparent mode is a software function which relays all communications to and from a slave processor 96, 98 directly to interface 92.

Multi-level hierarchies are also contemplated, in which a processor acts as a slave processor with respect to one processor but as a master processor to one or more other processors. In this case, the transparent mode for the "middle" processor, processor 96 in FIG. 7, for example, would involve relaying messages to and from its slave processor 98 to the master processor 94 under which it resides.

A slave processor is preferably configured during initialization using a flag or other setting so that it behaves as a slave processor and uses the correct interface and messaging protocol to communicate with its master processor.

Diagnostic mode functions and operations in the multi-processor electronic device 99 may be substantially as described above. However, a division of diagnostic functions between processors is also possible for multi-processor electronic devices. For example, where the processors 94, 96, 98 are implemented in different interconnected circuit cards within electronic equipment, each of the processors may execute respective diagnostic software code or respective segments of diagnostic software code.

The processors 94, 96, 98 may also have dedicated resources, including memory devices or areas in the memory 90 and/or interface devices in the interface 92. The processors 94, 96, 98 may have respective associated memory resources in the memory 90 for storing diagnostic test results or state information, for instance. Similarly, different diagnostic software code or operating software code to be executed by respective processors may also be stored in memory devices or areas associated with each processor. Combinations of shared and dedicated resources in the memory 90 and the interface 92 are also possible. Dedicated resources might be expected, for example, in embodiments in which the processors 94, 96, 98 are provided in different components of electronic equipment, such as circuit cards in the example described above.

Figure 8:
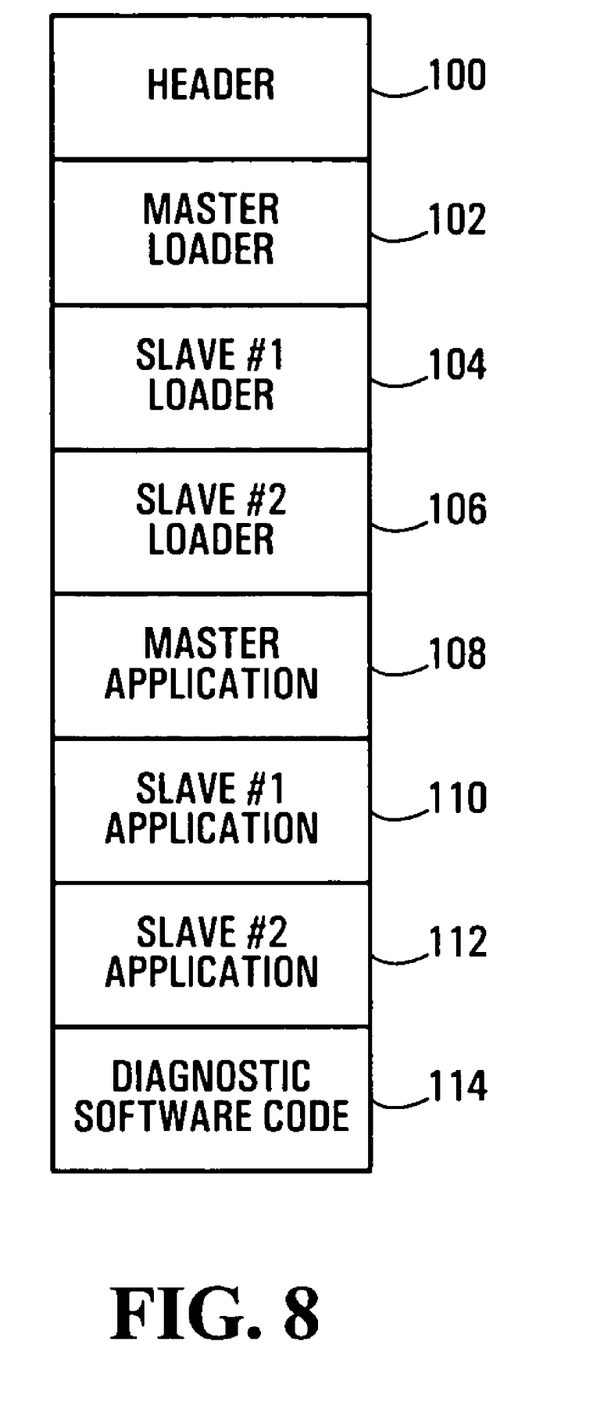
FIG. 8 is a block diagram of an example data structure according to an embodiment of the invention for the multi-processor electronic device of FIG. 7.

FIG. 8 is a block diagram of an example data structure according to an embodiment of the invention, for the multi-processor electronic device 99 of FIG. 7. The data structure of FIG. 8 may be stored, for example, in an application memory, illustratively a Flash memory device.

The header 100 may include such information as pointers to or memory addresses of other memory contents, illustratively the starting locations of any of the loaders 102, 104, 106, the applications 108, 110, 112, and the diagnostic software code 114.

The master loader 102, the slave #1 loader 104, and the slave #2 loader 106 represent boot software code executed by a master processor and two slave processors when an electronic device is started. Initialization and other startup operations are performed under control of the loaders 102, 104, 106.

As described above, each processor in a multi-processor electronic device may be configured to execute different respective operating software code, represented in FIG. 8 by the software applications 108, 110, 112. Thus, it will be apparent that FIG. 8 illustrates a shared memory arrangement in which a single memory device stores information associated with multiple processors.

The data structure of FIG. 8 also includes the diagnostic software code at 114. With dedicated diagnostic software code located in an application memory, it becomes possible to perform more exhaustive field diagnostics. In the embodiment shown in FIG. 8, even though master and slave processors execute different operating software code 108, 110, 112 in an operating mode, the same diagnostic software code 114 may be executed by all processors in a diagnostic mode. According to another embodiment, different diagnostic software code is provided for each processor.

One function of the master loader 102 in accordance with an embodiment of the invention is to determine whether an electronic device is to be operated in a diagnostic mode or a normal operating mode, and to load either the diagnostic software code 114 or the master application 108 from the application memory into an execution memory, illustratively a RAM, for execution. Each slave loader 104, 106 may similarly load either the diagnostic software code 114 or an application 110, 112 into a respective execution memory or memory area for execution by its processor. In one embodiment, the diagnostic or operating mode determination is made by the master processor under control of the master loader 102, and the slave loaders 104, 108 are responsive to the mode determination by the master processor. The master processor may set a flag or value indicating in which mode the device is to be operated, for example, in a memory location which is subsequently accessed by the slave loaders 104, 106. Alternatively, a mode flag is accessed by each of the loaders 102, 104, 106 to determine the electronic device mode.

The data structure of FIG. 8 represents a particular embodiment of the invention in which diagnostic software code is loaded by a loader and executed at startup of a multi-processor electronic device. Other embodiments are also contemplated. In a single processor electronic device, for example, only one loader would typically be provided. Depending upon the type of the electronic device, one or more software applications may be stored in an application memory.

Figure 9:
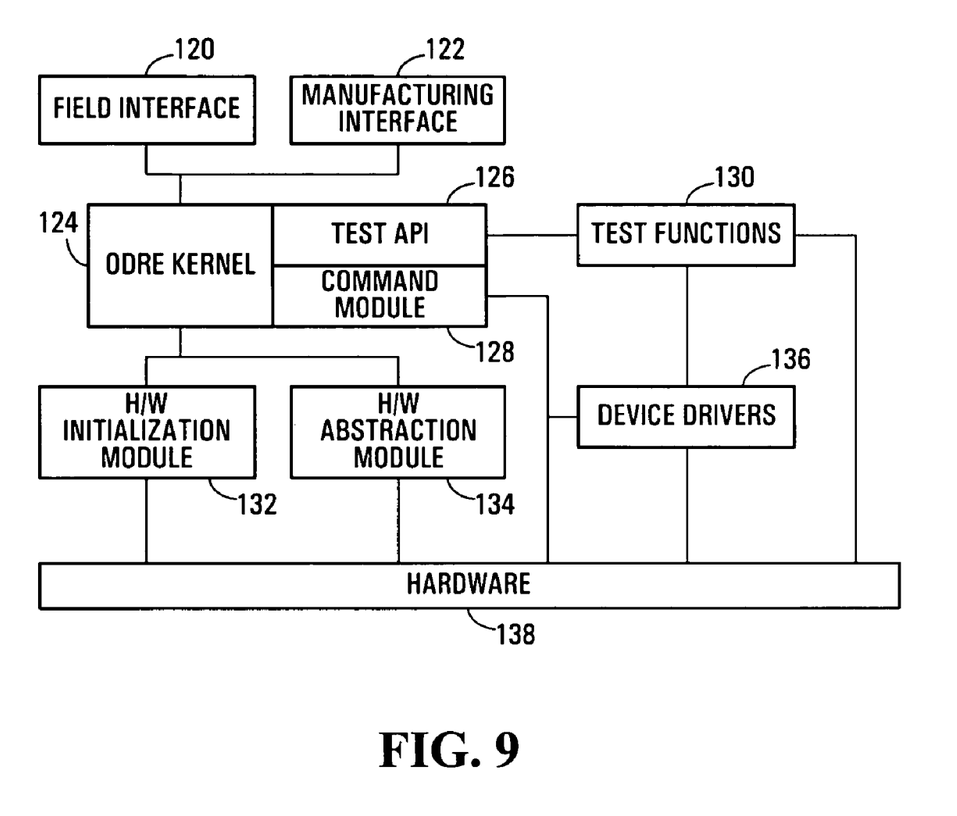
FIG. 9 is a block diagram of a diagnostic software code architecture according to an embodiment of the invention.

FIG. 9 is a block diagram of a diagnostic software code architecture according to an embodiment of the invention. The diagnostic software code comprises a plurality of software code modules, including a field interface 120, a manufacturing interface 122, an ODRE kernel 124, a test application programming interface (API) 126, a command module 128, test functions 130, a hardware initialization module 132, a hardware abstraction module 134, and device drivers 136. Although strictly not a software module, electronic device hardware is shown generally at 138 to provide an indication of the interaction between diagnostic software code and electronic device hardware.

The architecture shown in FIG. 9 is based on a simple software infrastructure which facilitates software code reuse by isolating hardware dependencies into specific software modules 132, 134. A flexible and portable architecture is thereby provided, in which the basic ODRE kernel 124 may be implemented on various types of target electronic device, including single-processor electronic devices, multi-processor electronic devices, or master and slave electronic devices in electronic equipment.

The ODRE kernel 124 is the core of the ODRE architecture, and is preferably hardware independent. The ODRE kernel 124 provides a programming interface 126 for all test functions 130 to use when accessing kernel based services like displaying messages or reporting errors, and is preferably a single tasking environment based on a command dispatcher model. This model is characterized by inherent simplicity and small code size. It may also be preferable to run low level diagnostics as a single thread to prevent exceptions caused by other threads from interfering with a current test. This situation could unnecessarily complicate a fault isolation and identification process.

A command dispatcher within the ODRE kernel provides the command parsing functionality described above. Valid commands are dispatched to the command module 128, where each command function is responsible for checking associated parameters if any are present, for example.

In the case of a multi-processor electronic device, the ODRE kernel 124 residing on a master processor also manages inter-processor communications and, in some embodiments, may be placed in the transparent mode described above.

Test functions 130 are preferably executed under the control of a simple test-sequencing module in the ODRE kernel

124. This module allows the user to control which tests are run and under what conditions (loop, pause on error, etc), for example.

Overall code space requirements for software code on an electronic device may be reduced by supporting code sharing, between diagnostic software code and operating software code in embodiments of the invention for instance. However, in a preferred embodiment of the invention as described above, diagnostic software is executable without a complete electronic device initialization or boot. Therefore, any shared code, the device drivers 136 for instance, may be invoked in two separate and different contexts, in application or operating mode and ODRE or in diagnostic mode. Therefore, any code with dependencies upon data structures and/or utility functions available in only one of these contexts might not compile or execute properly in the other context.

The test API 126 thus provides routines and structures which allow shared code to compile, link and run in the diagnostic mode environment without reproducing all operating mode data structures or functions upon which the shared code might otherwise be dependent. Thus, when an operating mode dependency of some sort is created for a device driver 136, access to shared functionality may be provided via the test API 126. Shared functions can then be accomplished in either context and, consequently, the device drivers 136 and ODRE diagnostics are portable. Code stubbing techniques may also be used for particular routines to be shared between diagnostic and operating modes.

For routines where code stubbing is not sufficient, power-up diagnostics which adhere to the test API 126 will also be compatible with the ODRE kernel 124. Examples of functions in which the test API 126 may provide dual functionality include power-up diagnostic reporting, memory management, and task-based timers.

The test functions 130 are a collection of software modules containing the actual embedded tests which may be shared between the ODRE and application environments. The test functions 130 are preferably designed as part of the related device drivers 136 wherever possible. This methodology enhances code sharing and may reduce the "learning curve" associated with new device drivers and test functions. The test functions 130 interface with the ODRE kernel 124 based on the test API 126, which specifies parameter list and return value definitions, for example.

In general, the test functions 130 attempt to validate a specific hardware functional block independently of other hardware to facilitate fault isolation. A test function preferably does not rely on the execution of any routines called outside the test function itself.

Generic setup and clear environment functions called before and after each test, for example, represent two possible exceptions to this general guideline. One purpose of these functions is to allow each test to be run independently by initializing or otherwise configuring an electronic device or any of its components appropriately prior to running the test and then returning the electronic device to a predetermined state after the test has been executed. An electronic device under test may thus be maintained in a predetermined state between tests, whereby all components which are not essential to the operation of the diagnostic software code could be disabled. Each test then starts from known operating conditions.

It should be appreciated, however, a predetermined test starting state might not always be desirable. For example, some components may take a relatively long time to initialize, thereby potentially greatly increasing the time it takes to run a suite of tests if any of these components are re-initialized between tests. Therefore, embodiments of the invention may be implemented with or without this type of test operating environment control functions.

According to one embodiment, the test functions 130 provide a verbose mode, which provides status information during test execution to indicate the progress of an active test, and a debug mode, which provides detailed error information in order to assist with the debugging of a faulty target electronic device.

The hardware initialization module 132 and the hardware abstraction module 134 represent hardware dependent modules in the architecture of FIG. 9.

The hardware initialization module 132 is the entry point into the ODRE infrastructure, and enables the minimal functionality required to bring up the ODRE kernel 124. Initialization functions performed by the hardware initialization module 132 may include, for example setting up registers for a particular programming language, illustratively the C language environment, installing exception vectors in their final location, performing additional electronic device and/or processor initialization, and re-initializing a UART for use with the C standard library functions.

The hardware abstraction module 134 provides hardware dependent support functions and specific runtime services to the ODRE kernel 124. These services may include exception and unassigned interrupt handling, low level UART interface functions, timers, and software watchdog. This module also preferably contains two complementary functions: one to set up a target electronic device before each test and one to clean up after each test, such that the electronic device is always in a known state before and after each test.

All diagnostics which do not require external test equipment or loopbacks are preferably made accessible in the field using the field interface module 120. In an interactive field diagnostic mode, the field interface module 120 causes a user interface, a standard VT terminal interface for instance, to be displayed at the electronic device or at a remote system or device as described above. This mode of operation allows a user to view text-based menus and execute specific tests or low-level debug commands, for example, as required. Interactive field mode may also be useful whenever a hardware or software designer doubts the hardware integrity of an electronic device.

A manufacturing diagnostic mode may take advantage of the facilities provided by a PC-based test executive or other test equipment. In this mode, a user interacts with the test executive, which in turn sends appropriate commands to the target electronic device. This mode may also take advantage of additional test and graphic capabilities of the test executive by sending formatted command strings to display user message windows, for example. The manufacturing interface module 122 represents software code resident on an electronic device to support interaction with a remote system or device.

Although this type of external device interaction is expected to be utilized most often in conjunction with the manufacturing diagnostic mode, it should be appreciated that similar display and control functions may be extended to remote systems in the interactive field diagnostic mode.

Embodiments of the invention thereby provide for enhanced function testing relative to conventional electronic device diagnostic techniques. In a preferred embodiment, the diagnostic software code used for field diagnostics is substantially the same as or a subset of that used for manufacturing or repair functional tests.

Dedicated diagnostic software code may be loaded into a memory of an electronic device and executed to perform functional tests when the electronic device is manufactured. Initial boot software code for starting an electronic device for the first time after manufacture may be configured to determine whether a physical jumper is present, and to load the diagnostic software code into the memory from an external source through a serial port or other interface when the jumper is detected.

Operating software code may then also be loaded into the memory, possibly after the electronic device has passed all functional tests and the above jumper, if present, has been removed. The diagnostic software code and the operating software code may be loaded into memory on an electronic device using the same interface or different interfaces.

Thereafter, either the dedicated diagnostic software code or the operating software code is executed in diagnostic and operating modes of the electronic device. As described above, a complete suite of functional tests may be available in a manufacturing diagnostic mode, whereas a subset of the complete functional test suite is available in a field diagnostic mode.

According to one embodiment, the diagnostic software code is first loaded into a volatile memory device for execution. The operating software code and the diagnostic software code are then loaded into a non-volatile memory device if the electronic device passes the functional tests.

Separately executable diagnostic and operating software code as described herein provides a further advantage of allowing diagnostic test results to be generated and accessible independently of operating software code. Diagnostics may be run on an electronic device and access to results may be provided, by storing the results in a memory for later access for example, regardless of whether operating software code can be executed on the device. Although the diagnostic test results may also be accessible by the operating software code during subsequent operation of the electronic device in a normal operating mode, embodiments of the invention provide an alternate access mechanism, illustratively through an interface of the electronic device.

What has been described is merely illustrative of the application of the principles of the invention. Other arrangements and methods can be implemented by those skilled in the art without departing from the present invention.

For example, the diagnostic and operating software code may include different types of software code. In one embodiment, the diagnostic software code itself includes different types of software code, with register, data segment, and hardware-dependent initialization operations being programmed in Assembly and subsequent initialization and diagnostic operations supported in C code. Other specific software code implementations will be apparent to those skilled in the art.

In addition, methods disclosed herein may be implemented as instructions on a computer-readable medium. One or both of the dedicated diagnostic software code and the operating software code may also be stored on the same medium.

Although execution of software code stored on an electronic device has been described above, it should be appreciated that embodiments of the invention may include other than executable software code. From the above description of FIG. 9, for example, diagnostic software code may include software modules which are compiled before execution. Other forms of software code which are processed before execution will be apparent to those skilled in the art, and may be used to implement embodiments of the invention. References to execution of software code should thus be interpreted accordingly.

As described above, diagnostic software code may be executed at startup of an electronic device. However, operating software code may also or instead automatically initiate execution of the diagnostic software code upon detection of a fault during normal operation of an electronic device. Whereas the diagnostic software code is dedicated software code executed in an independent offline mode of an electronic device, the operating software code may support other functions than normal operating functions of an electronic device. These other functions may include online diagnostics which are executed as a background task or in some other manner in the context of the operating software code so as not to significantly impact execution of the operating software code. If an error or failure is detected by the online diagnostics, then subsequent error processing may suspend or terminate operating software code execution and other normal operations, but the actual online diagnostics can be performed during normal execution of the operating software code.

In the event of error or failure detection by online diagnostics, the operating software code may pass control to the diagnostic software code without the need to reboot the electronic device. Therefore, although diagnostic software code execution is described above primarily in the context of startup or boot operations, it should be appreciated that execution of the diagnostic software code may be initiated at other times during electronic device operation, by the operating software code for instance.

We claim:

1. An electronic device, comprising:
   a memory storing dedicated diagnostic software code and operating software code, the memory comprising a non-volatile memory device, for storing the dedicated diagnostic software code and the operating software code, and a volatile memory device; and
   a processor configured to execute either the dedicated diagnostic software code in a diagnostic mode of the electronic device or the operating software code in an operating mode of the electronic device, the processor being further configured to load either the dedicated diagnostic software code or the operating software code from the non-volatile memory device into the volatile memory device for execution,
   wherein the dedicated diagnostic software code comprises software code for supporting a plurality of diagnostic modes,
   wherein the plurality of diagnostic modes comprises a field diagnostic mode and a manufacturing diagnostic mode having respective diagnostic test suites, wherein the manufacturing diagnostic mode test suite comprises internal diagnostic tests associated with internal components of the electronic device and external diagnostic tests associated with external testing equipment, and wherein the field diagnostic mode test suite comprises the internal diagnostic tests.

2. The electronic device of claim 1, wherein the memory comprises respective memory devices for storing the dedicated diagnostic software code and the operating software code.

3. The electronic device of claim 1, wherein the memory is further configured to store a flag indicating whether the electronic device is to be operated in the diagnostic mode or the operating mode, and wherein the processor is further configured to determine whether to execute the dedicated diagnostic software code or the operating software code by accessing the flag.

4. The electronic device of claim 3, wherein the memory comprises a plurality of memory devices, the plurality of memory devices comprising a memory device for storing the flag.

5. The electronic device of claim 1, wherein the memory is further configured to store boot software code, wherein the processor is further configured to execute the boot software code during a boot operation of the electronic device, and wherein the boot software code comprises software code for determining whether the electronic device is to be operated in the diagnostic mode or the operating mode.

6. The electronic device of claim 1, wherein the electronic device further comprises:
an interface,
wherein the plurality of diagnostic modes comprises an interactive mode in which information is transferred through the interface.

7. The electronic device of claim 1, wherein the diagnostic software code comprises software code for performing diagnostic tests on the electronic device and for storing results of the diagnostic tests in the memory.

8. The electronic device of claim 7, wherein the memory comprises a plurality of memory devices, the plurality of memory devices comprising a memory device for storing the diagnostic test results.

9. The electronic device of claim 7, wherein the operating software code comprises software code for accessing the results of the diagnostic tests.

10. The electronic device of claim 1, wherein the diagnostic software code comprises a plurality of software code modules.

11. The electronic device of claim 10, wherein the plurality of software code modules comprises a single tasking command dispatcher kernel.

12. The electronic device of claim 11, wherein the plurality of software code modules further comprises at least one software module selected from the group consisting of: a test application programming interface, a command software module, one or more test function software modules, one or more hardware interface modules, and one or more user interface modules.

13. The electronic device of claim 1, wherein the dedicated diagnostic software code comprises software code for performing a plurality of commands and for storing in the memory a state of the processor before any of the plurality of commands is performed.

14. The system of claim 13, wherein the dedicated diagnostic software code further comprises software code for restoring a state of the electronic device based on the stored state where an error occurs while the command is being performed.

15. The method of claim 1, wherein the operating software code comprises software code for performing online diagnostic tests during the operating mode, and for executing the dedicated diagnostic software code responsive to detection of an error by the online diagnostic tests.

16. The electronic device of claim 1, wherein the processor is one of a plurality of processors, each of the plurality of processors being configured to execute either the dedicated diagnostic software code in the diagnostic mode of the electronic device or the operating software code in the operating mode of the electronic device.

17. The electronic device of claim 16, wherein the plurality of processors comprises a master processor configured to determine whether the electronic device is to be operated in the diagnostic mode or the operating mode.

18. The electronic device of claim 17, wherein the plurality of processors further comprises at least one slave processor configured to be controlled by the master processor.

19. The electronic device of claim 17, further comprising:
an interface to the master processor,
wherein the plurality of processors further comprises at least one slave processor, and wherein the dedicated diagnostic software code comprises software code for providing a transparent mode of the master processor in which each slave processor is accessible through the interface.

20. The electronic device of claim 16, wherein the diagnostic software code comprises software code for performing diagnostic tests on the electronic device and for storing results of the diagnostic tests in the memory.

21. An electronic device comprising:
an interface;
a memory; and
a processor configured to load into the memory dedicated diagnostic software code received through the interface, to perform a plurality of functional tests on the electronic device by executing the dedicated diagnostic software code, to load into the memory operating software code received through the interface, and, after loading the operating software, to execute the dedicated diagnostic software code in a diagnostic mode of the electronic device,
wherein the interface comprises a plurality of interface devices, the plurality of interface devices comprising a first interface device configured to receive the diagnostic software code and a second interface device configured to receive the operating software code.

22. The electronic device of claim 21, wherein the processor is further configured to determine whether the electronic device passes the plurality of functional tests and to load the operating software code into the memory where the electronic device passes the functional tests.

23. The electronic device of claim 22, wherein the memory comprises a volatile memory device and a non-volatile memory device, and wherein the processor is configured to load the dedicated diagnostic software code into the volatile memory device, and to load the dedicated diagnostic software code and the operating software code into the non-volatile memory device where the electronic device passes the functional tests.

24. An electronic device, comprising:
a memory storing both diagnostic software code and operating software code;
a processor configured to execute either the diagnostic software code in a diagnostic mode of the electronic device or the operating software code in an operating mode of the electronic device, the diagnostic software code performing diagnostic tests on the electronic device and providing access to results of the diagnostic tests,
wherein the dedicated diagnostic software code comprises software code for supporting a plurality of diagnostic modes,
wherein the plurality of diagnostic modes comprises a field diagnostic mode and a manufacturing diagnostic mode having respective diagnostic test suites, wherein the manufacturing diagnostic mode test suite comprises internal diagnostic tests associated with internal components of the electronic device and external diagnostic tests associated with external testing equipment, wherein the field diagnostic mode test suite comprises the internal diagnostic tests, and
wherein access to the results of the diagnostic tests is provided independently of the operating software code.

25. The electronic device of claim 24, wherein the diagnostic software code causes the processor to store the results of the diagnostic tests in the memory to thereby provide access to the results of the diagnostic tests.

26. The electronic device of claim 25, wherein the memory comprises a first non-volatile memory device for storing the diagnostic software code and the operating software code and a second non-volatile memory device for storing the results of the diagnostic tests.

27. The electronic device of claim 24, wherein the results of the diagnostic tests are further accessible to the operating software code in the operating mode of the electronic device.

28. The electronic device of claim 24, wherein the processor is further configured to determine whether the electronic device is to be operated in the diagnostic mode, to execute the diagnostic software code where the electronic device is to be operated in the diagnostic mode, and to execute the operating software code where the electronic device is not to be operated in the diagnostic mode.

29. A method of operating an electronic device having a non-volatile memory device, in which both dedicated diagnostic software code and operating code are stored, and a volatile memory device, the method comprising:
   determining whether the electronic device is to be operated in a diagnostic mode or an operating mode;
   loading the dedicated diagnostic software code from the non-volatile memory device into the volatile memory device for execution and executing the dedicated diagnostic software code where the electronic device is to be operated in the diagnostic mode; and
   loading the operating software code from the non-volatile memory device into the volatile memory device for execution and executing the operating software code where the electronic device is to be operated in the operating mode,
   wherein the dedicated diagnostic software code comprises software code for supporting a plurality of diagnostic modes,
   wherein the plurality of diagnostic modes comprises a field diagnostic mode and a manufacturing diagnostic mode having respective diagnostic test suites, wherein the manufacturing diagnostic mode test suite comprises internal diagnostic tests associated with internal components of the electronic device and external diagnostic tests associated with external testing equipment, and wherein the field diagnostic mode test suite comprises the internal diagnostic tests.

30. A method of operating an electronic device, comprising:
   receiving dedicated diagnostic software code for the electronic device through a first interface device of the electronic device;
   loading the received dedicated diagnostic software code into a memory of the electronic device;
   performing functional tests on the electronic device by executing the dedicated diagnostic software code;
   determining whether the electronic device passes the functional tests;
   receiving operating software code for the electronic device through a second interface device of the electronic device;
   loading the received operating software code into the memory where the electronic device passes the functional tests; and
   after loading the operating software code into the memory, executing the dedicated diagnostic software code in a diagnostic mode of the electronic device.

* * * * *